US009989135B2

(12) United States Patent
Depraete

(10) Patent No.: US 9,989,135 B2
(45) Date of Patent: Jun. 5, 2018

(54) HYDROKINETIC TORQUE COUPLING DEVICE FOR A MOTOR VEHICLE

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 437 days.

(21) Appl. No.: 14/873,350

(22) Filed: Oct. 2, 2015

(65) Prior Publication Data

US 2017/0097080 A1 Apr. 6, 2017

(51) Int. Cl.
*F16H 45/02* (2006.01)
*F16D 25/0635* (2006.01)
*F16D 3/56* (2006.01)

(52) U.S. Cl.
CPC ......... *F16H 45/02* (2013.01); *F16D 25/0635* (2013.01); *F16D 3/56* (2013.01); *F16H 2045/0221* (2013.01)

(58) Field of Classification Search
None
See application file for complete search history.

(56) References Cited

U.S. PATENT DOCUMENTS 2,551,718 A 5/1951 Auten
4,145,936 A 3/1979 Vincent et al.
5,307,629 A * 5/1994 By .......................... F16H 41/26 60/342
5,515,955 A * 5/1996 Victoria .................. F16H 45/02 192/3.28
5,697,261 A 12/1997 Mokdad et al.
5,713,442 A * 2/1998 Murata ................... F16F 1/041 192/213.2
5,718,311 A * 2/1998 Victoria .................. F16H 45/02 192/3.28
5,893,355 A 4/1999 Glover et al.
2003/0106763 A1 6/2003 Kimura et al.
2015/0369296 A1 12/2015 Lopez-Perez

FOREIGN PATENT DOCUMENTS

DE 19729421 A1 1/1998
DE 19919449 A1 11/1999
DE 102004024747 A1 12/2005
EP 1048420 A2 11/2000
FR 2339107 A1 8/1977
FR 2493446 A1 5/1982
(Continued)

*Primary Examiner* — Colby M Hansen
(74) *Attorney, Agent, or Firm* — Berenato & White, LLC

(57) ABSTRACT

The invention relates to a hydrokinetic torque coupling device for a motor vehicle, comprising a torque input element (11) intended to be coupled to a crankshaft (1), an impeller wheel (3) rotationally coupled to the torque input element (11) and able to hydrokinetically drive a turbine wheel (4) through a reactor (5), a torque output element (8) intended to be coupled to a transmission input shaft (2), clutch means (10) adapted to rotationally couple the torque input element (11) and the torque output element (8) in an engaged position, through damping means (22, 26), and adapted to rotationally uncouple the torque input element (11) and the torque output element (8) in a disengaged position.

17 Claims, 3 Drawing Sheets

(56) References Cited

FOREIGN PATENT DOCUMENTS

| | | | |
|---|---|---|---|
| FR | 2499182 | A1 | 8/1982 |
| FR | 2628804 | A1 | 9/1989 |
| FR | 2714435 | A1 | 6/1995 |
| FR | 2828543 | A1 | 2/2003 |
| FR | 2938030 | A1 | 5/2010 |
| FR | 3000155 | A1 | 6/2014 |
| GB | 1212042 | A | 11/1970 |
| GB | 2235749 | A | 3/1991 |
| GB | 2262795 | A | 6/1993 |
| GB | 2283558 | A | 5/1995 |
| GB | 2284875 | A | 6/1995 |
| GB | 2468030 | A | 8/2010 |
| JP | 09280317 | A | 10/1997 |
| WO | WO9914114 | A1 | 3/1999 |
| WO | WO2004016968 | A1 | 2/2004 |
| WO | WO2011006264 | A1 | 1/2011 |
| WO | WO2014128380 | A1 | 8/2014 |

* cited by examiner

HYDROKINETIC TORQUE COUPLING DEVICE FOR A MOTOR VEHICLE

FIELD OF THE INVENTION

The present invention relates to a hydrokinetic torque coupling device for a motor vehicle, such as a torque converter, for instance.

BACKGROUND OF THE INVENTION

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7*a*, 7*b* of the compression spring type is mounted between the guiding washers 6 and a central hub 8 coupled to the transmission input shaft 2. The elastic members 7*a*, 7*b* of the first group are arranged in series through a phasing member 9, so that said elastic members 7*a*, 7*b* are deformed in phase with each other, with said phasing member 9 being movable relative to the guiding washers 6 and relative to the hub 8.

A second group of elastic members 7*c* is mounted with some clearance between the guiding washers 6 and the central hub 8 in parallel with the first group of elastic members 7*a*, 7*b*, with said elastic members 7*c* being adapted to be active on a limited angular range, more particularly at the end of the angular travel of the guiding washers 6 relative to the central hub 8. The angular travel, or the angular shift noted a, of the guiding washers 6 relative to the hub 8, is defined relative to a rest position ($\alpha=0$) wherein no torque is transmitted through damping means formed by the above-mentioned elastic members 7*a*, 7*b*.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7*c* makes it possible to increase the stiffness of the damping means at the end of the angular travel, i.e. for a significant a angular offset of the guiding washers 6 relative to the hub 8 (or vice versa).

It can be seen that the representation of function $M=f(\alpha)$ which defines the M torque transmitted though the device according to the $\alpha$ angular shift, comprises a first linear portion of slope Ka (for the low values of the $\alpha$ angular shift) and a second, more important, linear portion of slope Kb (for the high value of the $\alpha$ angular shift). Ka and Kb are the angular stiffness of the device, at the beginning and at the end of the angular travel respectively. If K1 defines the cumulated stiffness of the first springs of each pair of the first group, and K2 defines the cumulated stiffness of the second springs of each pair of the first group, and K3 defines the cumulated stiffness of the springs of the second group, then $Ka=(K1\cdot K2)/(K1+K2)$ and $Kb=Ka+K3$.

The break of slope between the first and second portions of the curve may generate vibrations and a significant hysteresis upon operation of the torque converter which might affect the quality of filtration obtained using the damping means.

SUMMARY OF THE INVENTION

The invention more particularly aims at providing a simple, efficient and cost-effective solution to this problem.

For this purpose, it provides for a hydrokinetic torque coupling device for a motor vehicle, comprising a torque input element intended to be coupled to a crankshaft, a turbine wheel, an impeller wheel rotationally coupled to the torque input element and able to hydrokinetically drive the turbine wheel, a torque output element intended to be coupled to a transmission input shaft, damping means, clutch means adapted to rotationally couple the torque input element and the torque output element in an engaged position, through damping means, and able to rotationally uncouple the torque input element and the torque output element in a disengaged position, with the damping means being adapted to act against the rotation of the torque input element relative to the torque output element, in the engaged position of the clutch means, with the damping means comprising at least an elastic blade which rotates together with the torque output element or the clutch means respectively, and a supporting member carried by the clutch means or the torque output element respectively, with the blade being elastically maintained supported by said supporting member, with said elastic blade being adapted to bend upon rotation of the torque input element relative to the torque output element, in an engaged position, with the elastic blade or the supporting member respectively being mounted on at least a first flange, with the supporting member or the elastic blade respectively being mounted on at least a second flange adapted to pivot relative to the first flange, with a bearing being mounted between the first flange and the second flange.

Such damping means give a characteristic gradual curve, without any break of slope. The invention thus makes it possible to reduce the vibrations generated in operation and provides a high quality of filtration.

Besides, such a hydrokinetic torque coupling device is easy to mount and rather inexpensive.

It should be noted that the words “radial” and “axial” are defined with respect to the hydrokinetic torque coupling device, which is the axis of rotation of the impeller wheel or of the turbine wheel.

It should be noted that a hydrokinetic torque coupling device may be a torque converter when the hydrokinetic torque coupling means comprise an impeller wheel, a turbine wheel and a reactor, or may be a hydrokinetic coupling device when the hydrokinetic torque coupling means have no reactor.

Besides, mounting a bearing between the first and second flanges makes it possible to ensure a correct rotational guiding of both flanges.

The first flange and the second flange may each comprise a cylindrical rim, with the bearing being radially mounted between said cylindrical rims.

Besides, the second flange may comprise a radially internal part, and a radially external part whereon the supporting member or the elastic blade respectively is mounted, with the radially internal and external parts being fastened together, by rivets for instance.

Besides, the first flange may rotate together with the torque output element, with the second flange being at least partially positioned radially outside the first flange.

The hydrokinetic torque coupling device may comprise two radially internal flanges rotating together with the torque output element and two radially external flanges, at least partially extending radially outside the internal flanges and so mounted as to pivot about said internal flanges, with the elastic blade being mounted in a space axially arranged between the internal flanges and/or between the external flanges, with the supporting member being mounted in a space axially arranged between the external flanges, respectively the internal flanges, with one of the internal flanges forming the first flange, and one of the external flanges forming the second flange.

Besides, the turbine wheel may be rotationally coupled to the torque output element and to the first flange.

The clutch means may comprise at least one piston rotationally coupled to the second flange, with the piston being movable between an engaged position wherein it is rotationally coupled to the torque input element and a disengaged position wherein it is rotationally uncoupled from the torque input element.

In this case, the piston is rotationally coupled to the second flange through a linking member comprising a protruding or recessed part adapted to engage into a recessed or protruding part of the second flange.

Besides, the torque output element may comprise a radial surface, with the motion of the piston in the engaged position being limited by the piston resting on said radial surface of the torque output element.

Besides, the torque output element may comprise a central hub.

The bearing may be a rolling bearing or a ring, for instance a guiding ring made of plastic or bronze, or more generally a ring having a low coefficient of friction comprising a non-stick coating, for instance. Such a ring may be mounted through a friction-type connection on the first flange or the second flange.

Besides, the hydrokinetic torque coupling device may comprise a reactor, with the impeller wheel being adapted to hydrokinetically drive the turbine wheel through the reactor. The hydrokinetic torque coupling device thus forms a torque converter.

The hydrokinetic torque coupling device may also comprise one or more of the following characteristics:

- the supporting member comprises at least one rolling body, such as a roller so mounted as to pivot about a shaft, for instance through a rolling bearing, such as a needle bearing, for instance.
- the supporting member is mounted on the radially external periphery of the supporting flange,
- the impeller wheel is rotationally coupled to a cover wherein the impeller wheel, the turbine wheel, the reactor, the flanges and/or the damping means are at least partially accommodated.
- the torque input element comprises said cover,
- the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a circumferential component which tends to move back the torque input element and the torque output element toward said relative rest position.
- the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a radial component which tends to maintain the elastic blade in contact with the supporting member,
- in the engaged position, the angular displacement of the torque input element relative to the torque output element is greater than 20° and preferably greater than 40°.
- the elastic blade comprises a fastening portion and an elastic portion comprising a radially internal strand, a radially external strand and a bowed or bent portion connecting the internal strand and the external strand.
- the damping means comprise at least two elastic leaves, with each elastic blade rotating together with the torque output element, or the torque input element in engaged position respectively, with each blade being associated with a supporting element rotationally linked with the torque input element in engaged position, or the torque output element respectively, with each blade being elastically maintained supported by said matching supporting element, with each elastic blade being adapted to bend upon rotation of the torque input element relative to the torque output element in engaged position.
- the impeller wheel is rotationally coupled to the torque input element and is adapted to hydrokinetically drive the turbine wheel, through a reactor.
- the turbine wheel and the first flange may rotate together with the torque output element through a common fastening means or each one rotate through a different fastening means.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 1:
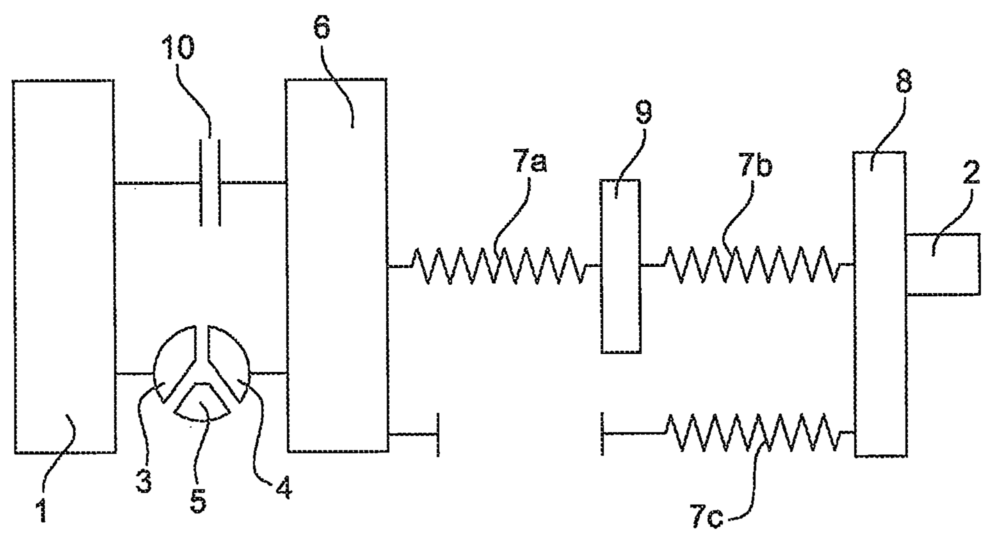
FIG. 1 is a schematic representation of a torque converter of the prior art.
Figure 2:
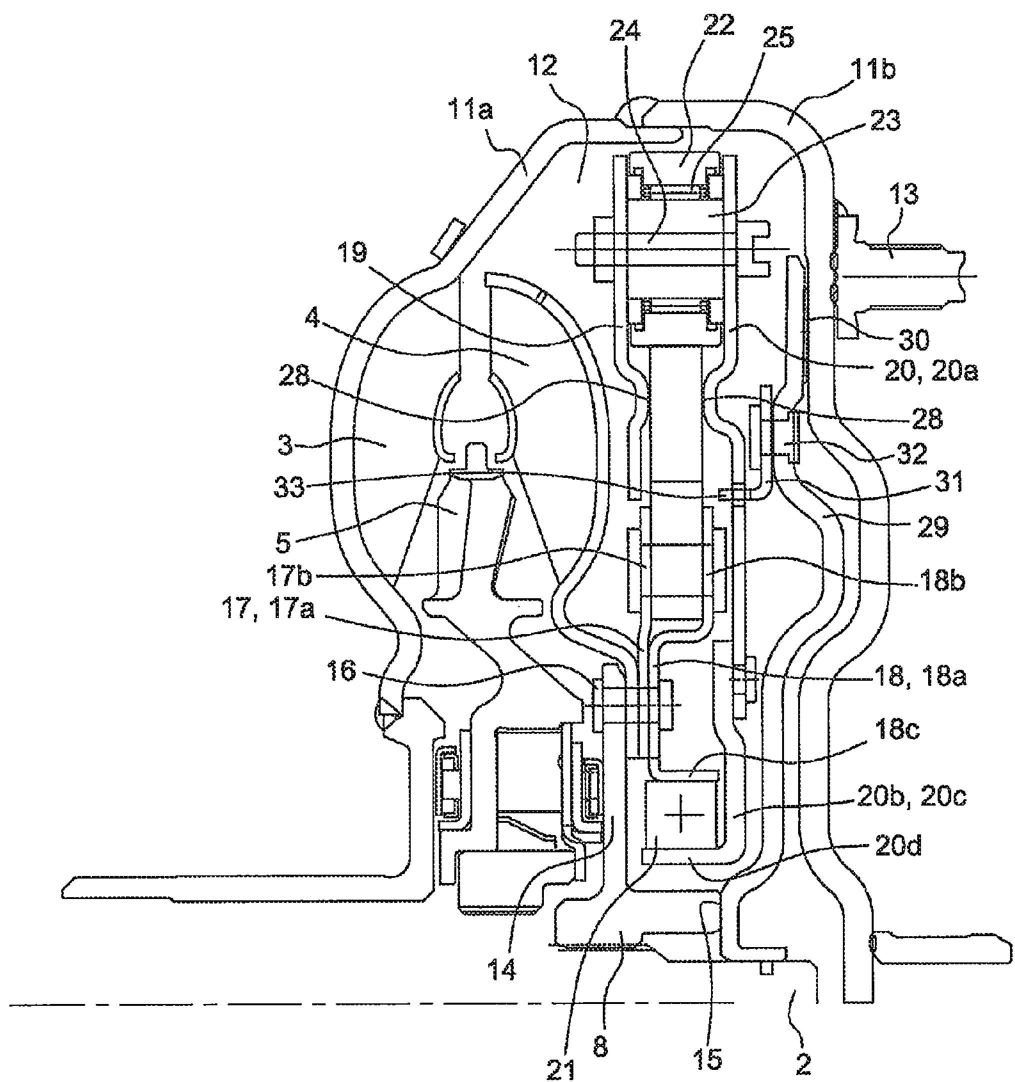
FIG. 2 is a half-sectional view along an axial plane, of a torque converter according to a first embodiment of the invention.
Figure 3:
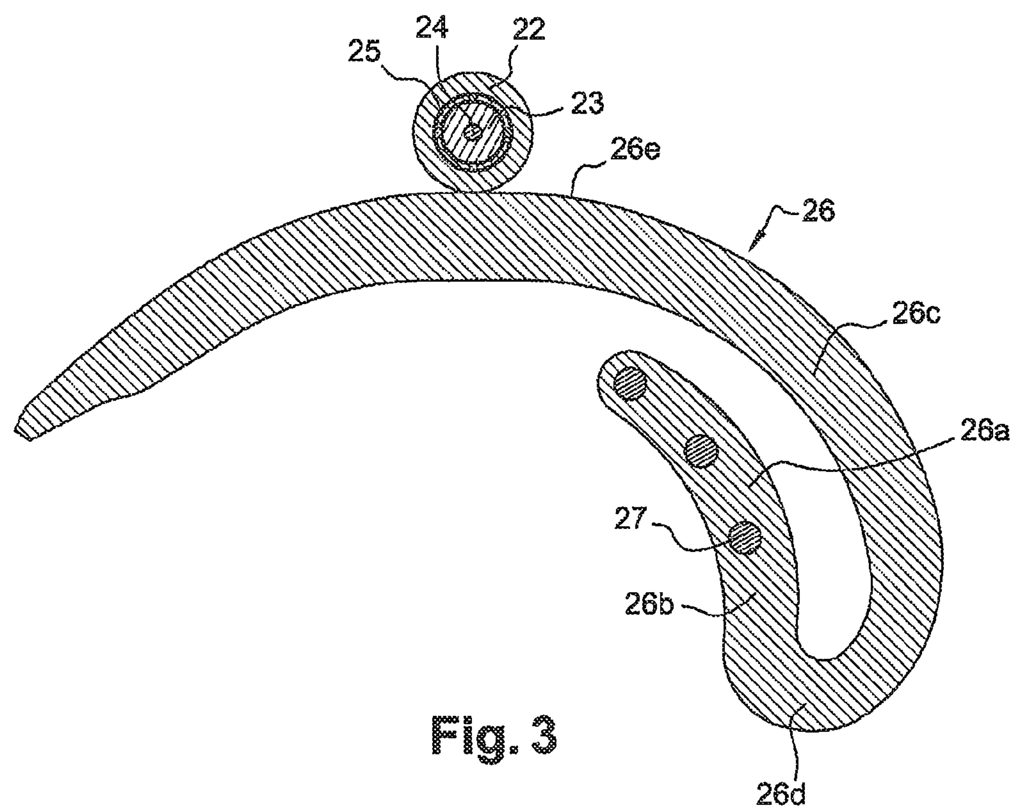
FIG. 3 is a sectional front view illustrating a supporting member and an elastic blade of a torque converter according to the invention.

A hydrokinetic torque coupling device according to a first embodiment of the invention is shown in FIGS. 2 and 3. The hydrokinetic torque coupling device is more particularly a hydrodynamic torque converter. Such device makes it possible to transmit a torque from the output shaft of an internal combustion engine in a motor vehicle, such as for instance a crankshaft 1, to a transmission input shaft 2. The axis of the torque converter bears reference X.

In the following, the words “axial” and “radial” are defined relative to the X axis.

The torque converter conventionally comprises an impeller bladed wheel 3, able to hydrokinetically drive a turbine bladed wheel 4 through a reactor 5.

The impeller wheel 3 is fastened to a cover consisting of two belt-shaped parts 11*a*, 11*b* assembled together by welding and defining an internal volume 12 accommodating the impeller wheel 3, the turbine wheel 4 and the reactor 5. Said cover 11*a*, 11*b*, also more generally referred to as cover 11, comprises fastening means 13 making it possible to rotationally couple said cover 11 with the crankshaft 1.

The torque converter further comprises a central hub 8, the radially internal periphery of which is ribbed, with an X axis and accommodated in the internal volume 12 of the cover 11. The central hub 8 comprises an annular rim 14 which radially extends outwards and a front end, facing the turbine wheel, which forms a radial surface 15.

The turbine wheel 4 is fastened to the first annular rim 14 of the central hub 8, for instance by rivets 16 or by welding.

Two radially internal annular flanges 17, 18 are mounted in said internal volume 12, with the two flanges 17, 18 being fastened by their radially internal periphery to the rim 14 of the hub 8 by rivets 16, as mentioned above, or by welding, for instance.

The flanges 17,18 radially extend and comprise each a radially internal portion 17*a*, 18*a* and a radially external portion 17*b*, 18*b*. The radially internal portions 17*a*, 18*a* of both flanges 17, 18 are axially closer to each other than the radially external portions 17*b*, 18*b* of both flanges 17, 18.

The front internal flange 18, i.e. opposite the turbine wheel 4 further comprises a cylindrical rim 18*c* on the radially internal periphery thereof, with said rim axially extending frontwards.

Two radially external annular flanges 19, 20 are further mounted in the internal volume 12 of the cover 11 around the internal flanges 17, 18. The external flanges 19, 20 are fastened together as will be described in greater details hereunder.

The external flange 19 positioned behind or in the vicinity of the turbine wheel 4 is totally positioned radially outside the internal flanges 17, 18. The external flange 20 positioned on the front, partially extends radially beyond the internal flanges 17, 18 and partially extends radially opposite said internal flanges 17, 18. The external flange 20 more specifically comprises a first radially internal part 20*a*, and a second radially external part 20*b* fastened together by rivets, for instance. The second part 20*b* of the flange 20 comprises a radial zone 20*c* fastened to the first part 20*a* and a cylindrical rim 20*d*.

A rolling bearing 21, such as a ball bearing, is radially mounted between the cylindrical rims 18*c*, 20 so that the flange 20 is so mounted as to pivot on the flange 18 through the rolling bearing 21.

Two supporting members or rolling bodies 22 shaped as rollers or cylindrical rollers, are fixed on the radially external periphery of the external flanges 19, 20. The rolling bodies 22 are positioned so as to be diametrically opposed. The rolling bodies 22 are more specifically mounted about shafts 23 which axially extend between the two external flanges, with said shafts being mounted on the external flanges 19, 20 using bolts 24 or rivets, for instance. The rolling bodies 22 are mounted on the shafts 23 through rolling bearings 25, such as needle bearings, for instance.

The shafts 23 form spacers which make it possible to preserve the spacing between the external flanges 19, 20, with the latter being fastened together at least by bolts 24 or matching rivets.

Two elastic leaves 26 are mounted between the internal and the external flanges. More particularly, as can be best seen in FIG. 3, each elastic blade 26 comprises a fastening portion 26*a*, mounted between the radially external parts 17*b*, 18*b* of the two internal flanges 17, 18 and fastened to the latter by rivets 27, here three in number for each blade 26, and an elastic portion comprising a radially internal strand 26*b*, a radially external strand 26*c*, and a bowed or bent portion 26*d* connecting the internal strand 26*b* and the external strand 26*c*. The bowed or bent portion 26*d* has an angle of approximately 180°. In other words, the elastically deformable portion of the elastic blade 26 has two regions radially shifted relative to each other and separated by a radial space.

The external strand 26*d* develops on the circumference with an angle ranging from 120° to 180°. The radially external strand 26*c* comprises a radially external surface 26*e* which forms a raceway supported by the corresponding rolling body 22, with said rolling body 22 being positioned radially outside the external strand 26*e* of the elastic blade 26. The raceway 26*e* has a globally convex shape. The raceway 26*e* may directly consist of a zone of the external strand 26*c* or of a part which is added onto said external strand 26*c*.

Each external strand 26*c* is adapted to axially rest on opposite radial surfaces 28 of the external flanges 19, 20.

Between each elastic blade 26 and the matching rolling body 22, the transmitted torque is broken down into radial stresses and peripheral stresses. Radial stresses make it possible for the matching blade 26 to bend and peripheral stresses make it possible for the matching rolling body 22 to move on the raceway 26*e* of the blade 26 and to transmit the torque.

The torque converter further comprises clutch means 10 adapted to rotationally couple the cover 11 and the external flanges 19, 20 in the engaged position, and adapted to release the cover 11 of the external flanges 19, 20 in a disengaged position.

The clutch means 10 comprise an annular piston 29 which extends radially and is accommodated in the inner space 12 of the cover 10, the radially external periphery of which comprises a resting area equipped with clutch lining 30 and adapted to rest on the part lib of the cover 11 in an engaged position, so as to provide a rotational coupling of the cover 11 and the piston 29.

A linking member 31 is fastened to the piston, for instance by rivets 32, in a zone positioned radially inside the clutch lining 30. The linking member 31 and the cover 11 may of course consist of one single part, without the operation of the torque converter being affected.

The linking member 31 comprises at least protruding zones 33 engaged in recessed zones 34 of the flange 20. More particularly, the protruding parts 33 are formed by cutting and folding the linking member for instance.

The piston 29 is thus rotationally coupled to the external flanges 19, 20 while enabling the axial motion of the piston 29 relative to the flange 20 between the engaged and disengaged positions thereof. The motion of the piston 29 is controlled by pressure chambers positioned on either side of the piston 29. Besides, the motion of the piston 29 in the disengaged position may be limited by the radially internal periphery of the piston 29 resting on the annular rim 15 of the central hub 8.

It should be noted that, in this embodiment, the piston 29 can be so mounted as to pivot directly about the transmission input shaft 2.

Such clutch means 10 make it possible to transmit a torque from the crankshaft 1 to the transmission input shaft 2, in a determined operation phase, without any action by the hydrokinetic coupling means consisting of the impeller wheel 3, the turbine wheel 4 and the reactor 5.

In operation, the torque from the crankshaft 1 is transmitted to the cover 11 through the fastening means 13. In the disengaged position of the piston 29, the torque goes through the hydrokinetic coupling means, i.e. the impeller wheel 3 and then the turbine wheel 4 fixed to the hub 8. The torque is then transmitted to the transmission input shaft 2 coupled to the hub through the internal ribs of said hub 8.

In the engaged position of the piston 29, the torque from the cover 11 is transmitted to the external flanges 19, 20, then to the internal flanges 17, 18 through the damping means formed by the elastic leaves 26 and by the supporting members 22. The torque is then transmitted to the internal hub 8 whereon the internal flanges 17, 18 are mounted, then to the transmission input shaft 2 coupled to the hub 8 through the internal ribs of said hub 8.

In the engaged position of the piston 29, when the torque transmitted between the cover 11 and the hub 8 varies, the radial stresses exerted between each elastic blade 26 and the matching rolling body 22 vary and the bending of the elastic blade 26 is modified. The modification in the bending of the blade 26 comes with a motion of the rolling body 22 along the matching raceway **26*e*** due to peripheral stresses.

The raceways **26*e* have profiles so arranged that, when the transmitted torque increases, the rolling bodies 22 each exert a bending stress on the matching elastic blade 26 which causes the free distal end of the elastic blade 26 to move towards the X axis and a relative rotation between the cover 11 and the hub 8 such that the later move away from their relative rest position. Rest position means the relative position of the cover 11 relative to the hub 8**, wherein no torque is transmitted between the latter.

The profiles of the raceways **26*e* are thus such that the rolling bodies 22 exert bending stresses having radial components and circumferential components onto the elastic leaves 26**.

The elastic leavers 26 exert, onto the rolling bodies 22, a backmoving force having a circumferential component which tends to rotate the rolling bodies 22 in a reverse direction of rotation and thus to move back the turbine wheel 4 and the hub 8 towards their relative rest position, and a radial component directed outwards which tends to maintain the raceway **26*e* supported by the matching rolling body 22**.

When the cover 11 and the hub 8 are in their rest position, the elastic leaves 26 are preferably radially pre-stressed toward the X axis so as to exert a reaction force directed radially outwards, so as to maintain the leaves 26 supported by the rolling bodies 22.

The profiles of the raceways **26*e*** may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 11 relative to the hub 8 may be greater than 20°, preferably greater than 40°.

The elastic leaves 26 are regularly distributed around the X axis and are symmetrical relative to the X axis so as to ensure the balance of the torque converter.

The torque converter may also comprise friction means so arranged as to exert a resisting torque between the cover 11 and the hub 8 during the relative displacement thereof so as to dissipate the energy stored in the elastic leaves 26.

The invention claimed is:

1. A hydrokinetic torque coupling device for a motor vehicle, comprising a torque input element (11) intended to be coupled to a crankshaft (1), a turbine wheel (4), an impeller wheel (3) rotationally coupled to the torque input element (11) and able to hydrokinetically drive the turbine wheel (4), a torque output element (8) intended to be coupled to a transmission input shaft (2), damping means (22, 26), clutch means (10) adapted to rotationally couple the torque input element (11) and the torque output element (8) in an engaged position, through the damping means (22, 26), and able to rotationally uncouple the torque input element (11) and the torque output element (8) in a disengaged position, with the damping means (22, 26) being adapted to act against the rotation of the torque input element (11) relative to the torque output element (8), in the engaged position of the clutch means (10), with the damping means (22, 26) comprising at least an elastic blade (26) which rotates together with the torque output element (8) or the clutch means (10) respectively, and a supporting member (22) carried by the clutch means (10) or the torque output element (8) respectively, with the blade (26) being elastically maintained supported by said supporting member (22), with said elastic blade (26) being adapted to bend upon rotation of the torque input element (11) relative to the torque output element (8), in an engaged position, with the elastic blade (26) or the supporting member (22) respectively being mounted on at least a first flange (18), with the supporting member (22) or the elastic blade (26) respectively being mounted on at least a second flange (20) adapted to pivot relative to the first flange (18), with a bearing (21) being mounted between the first flange (18) and the second flange (20).

2. A hydrokinetic torque coupling device according to claim 1, wherein the first flange (18) and the second flange (20) each comprise a cylindrical rim (**18*c*, 20*d*), with the rolling bearing (21) being radially mounted between said cylindrical rims (18*c*, 20*d***).

3. A hydrokinetic torque coupling device according to claim 2, wherein the second flange (20) comprises a radially internal part (**20*b*), and a radially external part (20*a*) whereon the supporting member (22) or the elastic blade (26) respectively is mounted, with the radially internal and external parts (20*b*, 20*a***) being fastened together, by rivets for instance.

4. A hydrokinetic torque coupling device according to claim 2, wherein the first flange (18) rotates together with the torque output element (8), with the second flange (20) being at least partially radially positioned outside the first flange (18).

5. A hydrokinetic torque coupling device according to claim 1, wherein the second flange (20) comprises a radially internal part (**20*b*), and a radially external part (20*a*) whereon the supporting member (22) or the elastic blade (26) respectively is mounted, with the radially internal and external parts (20*b*, 20*a***) being fastened together, by rivets for instance.

6. A hydrokinetic torque coupling device according to claim 5, wherein the first flange (18) rotates together with the torque output element (8), with the second flange (20) being at least partially radially positioned outside the first flange (18).

7. A hydrokinetic torque coupling device according to claim 1, wherein the first flange (18) rotates together with the torque output element (8), with the second flange (20) being at least partially radially positioned outside the first flange (18).

8. A hydrokinetic torque coupling device according to claim 7, wherein the first flange (18) rotates together with the torque output element (8), with the second flange (20) being at least partially radially positioned outside the first flange (18).

9. A hydrokinetic torque coupling device according to claim 1, wherein it comprises two radially internal flanges (17, 18) rotating together with the torque output element (8) and two external flanges (19, 20) extending at least partially radially outside the internal flanges (17, 18), and so mounted as to pivot about said internal flanges (17, 18), with the elastic blade (26) being mounted in a space axially arranged between the internal flanges (17, 18) and/or between the external flanges (19, 20), with the supporting member (22) being mounted in a space axially arranged between the external flanges (19, 20), respectively between the internal flanges (17, 18), with one of the internal flanges (17, 18) forming the first flange (18), with one of the external flanges (19, 20) forming the second flange (20).

10. A hydrokinetic torque coupling device according to claim 1, wherein the turbine wheel (4) is rotationally coupled to the torque output element (8) and to the first flange (18).

11. A hydrokinetic torque coupling device according to claim 1, wherein the clutch means (10) comprise at least one piston (29) rotationally coupled to the second flange (20), with the piston (29) being movable between an engaged position wherein it is rotationally coupled to the torque input element (11) and a disengaged position wherein it is rotationally uncoupled from the torque input element (11).

12. A hydrokinetic torque coupling device according to claim 11, wherein the piston (29) is rotationally coupled to the second flange (20) through a linking member (31) comprising a protruding (33) or recessed part adapted to engage into a recessed (34) or protruding part of the second flange (20).

13. A hydrokinetic torque coupling device according to claim 12, wherein the torque output element (8) comprises a radial surface (15), with the motion of the piston (29) in the engaged position being limited by the piston (29) resting on said radial surface (15) of the torque output element (8).

14. A hydrokinetic torque coupling device according to claim 1, wherein the torque output element comprises a central hub (8).

15. A hydrokinetic torque coupling device according to claim 1, wherein the bearing is a rolling bearing (21).

16. A hydrokinetic torque coupling device according to claim 1, wherein the bearing is a ring.

17. A hydrokinetic torque coupling device according to claim 1, wherein it comprises a reactor (5), with the impeller wheel (3) being able to hydrokinetically drive the turbine wheel (4) through the reactor (5).

* * * * *